United States Patent [19]

Macholdt et al.

[11] Patent Number: 4,957,841
[45] Date of Patent: Sep. 18, 1990

[54] SPECIFICALLY INFLUENCING THE TRIBOELECTRIC EFFECT OF AZO PIGMENTS

[75] Inventors: Hans-Tobias Macholdt, Darmstadt; Alexander Sieber; Franz Schui, both of Frankfurt am Main; Reinhold Deubel, Bad Soden am Taunus, all of Fed. Rep. of Germany

[73] Assignee: Hoechst Aktiengesellschaft, Frankfurt am Main, Fed. Rep. of Germany

[21] Appl. No.: 407,225

[22] Filed: Sep. 14, 1989

[30] Foreign Application Priority Data

Sep. 15, 1988 [DE] Fed. Rep. of Germany ....... 3831384

[51] Int. Cl.$^5$ .................... G03G 9/00; G03G 5/00; C08K 5/00; C09K 00/00
[52] U.S. Cl. .................... 430/110; 430/106; 430/109; 430/137; 106/493; 252/1; 524/904
[58] Field of Search ............... 430/106, 110, 137, 109; 106/493; 252/1

[56] References Cited

U.S. PATENT DOCUMENTS

| 2,221,776 | 11/1940 | Carlson . | |
| 4,291,122 | 9/1981 | Chin | 430/110 |
| 4,312,933 | 1/1982 | Chin | 430/122 |
| 4,324,851 | 4/1982 | Lu et al. . | |
| 4,681,829 | 7/1987 | Grushkin | 430/109 |
| 4,758,489 | 7/1988 | Tomita et al. . | |

FOREIGN PATENT DOCUMENTS 1124957  6/1986  Japan ..................... 430/106

Primary Examiner—Marion C. McCamish
Assistant Examiner—S. C. Crossan

[57] ABSTRACT

Process for specifically influencing the triboelectric effect of azo pigments in electrophotographic toners or developers or in powders for surface coating by adding to the azo pigments at the coupling reaction stage, at the laking stage or in the course of finishing at least one saltlike, cationic compound whose positively charged center is a nitrogen, phosphorus, arsenic or antimony atom or the group

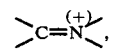

and use of such azo pigments for producing toners or developers used for the electrophotographic copying or manifolding of originals or for printing electronically, optically or magnetically stored data or in colorproofing or use of such azo pigments for producing powders or powder coatings used for the surface coating of articles made of metal, wood, plastics, glass, ceramics, concrete, textile material, paper or rubber.

7 Claims, No Drawings

SPECIFICALLY INFLUENCING THE TRIBOELECTRIC EFFECT OF AZO PIGMENTS

DESCRIPTION

The present invention relates to a process for specifically influencing the triboelectric effect of azo pigments, in particular of laked azo pigments (i.e. metal salts of azo pigments), in electrophotographic toners or developers or in powders for surface coating by the addition of specific saltlike cationic compounds at the coupling reaction stage, at the laking (metal salt formation) stage or in the course of finishing, and to the use of the azo pigments provided with the saltlike, cationic compounds for producing toners or developers which are used for the electrophotographic copying or manifolding of originals or for printing electronically, optically or magnetically stored data or in colorproofing and for producing powders or powder coatings used for the surface coating of articles made of metal, wood, plastics, glass, ceramics, concrete, textile materials, paper or rubber.

In electrophotographic recording processes, a latent charge image is produced on a photoconductor, for example by charging the photoconductor by means of a corona discharge and subsequently subjecting the electrostatically charged surface of the photoconductor to imagewise exposure to bring about charge flowoff to the grounded support surface in the exposed areas. The latent charge image thus produced is then developed by applying a toner.

In a subsequent step, the toner is transferred from the photoconductor to for example paper, textiles, foils or plastic, where it is fixed for example by pressure, radiation, heat or solvent action. The photoconductor used is then cleaned, and is ready for a fresh recording process.

Numerous patent specifications described the optimization of toners, concentrating inter alia on the effect of the toner binder (variation of resin/resin components or wax/wax components), the effect of control agents or other additives or the effect of carriers (in the case of two-component developers) and magnetic pigments (in the case of one-component developers (U.S. Pat. No. 2,221,776). A measure of toner quality is its specific chargeability Q/M (charge per unit mass).

Besides the sign and magnitude of the charge on the toner, it is in particular the charge profile as a function of the activation time which is particularly suitable for an exact description of the triboelectric characteristics of a toner or developer.

The use of azo pigments as colorants in electrophotographic toners has been known for a long time. It is also known that azo pigments (JP-A2-60/108,863) and in particular laked azo pigments (JP-A2-62/71,966 and also H. T. Macholdt, A. Sieber, Dyes and Pigments 9, 119–127 (1988)) confer a high negative triboelectric charge on electrophotographic toners.

It is accordingly difficult to prepare for example triboelectrically positively chargeable toners with azo pigments, in particular with laked azo pigments. JP-A2-60/118,851 describes an attempt to solve this problem by the addition of nigrosine. It is true that nigrosine acts as a positive charge control agent in this toner, but its black self-color makes it problematical for colored toners. Another approach is described in DE No. 3,629,445. By admixing C.I. Pigment Red 81 (a triarylcarbonium pigment) into a toner which contains a laked azo pigment as colorant, it is possible to confer positive chargeability on the toner. Moreover, it is generally known to use colorless charge control agents, which makes it possible to adjust to the desired toner chargeability (U.S. Pat. No. 4,324,851, EP No. 0,161,128). All the abovementioned approaches have the defect that the charge-controlling additive must be incorporated into the toner resin in addition to the pigment and the other toner ingredients, which presents problems as regards uniform distribution, compatibilities and migration and, what is more, necessitates an additional operation.

In the case of color toners for process ink, the three toners yellow, cyan and magenta, besides meeting the precisely defined color requirements, must also be exactly adapted to one another in respect of their triboelectric properties. Triboelectric adaptation is necessary because in full color printing or full color copying the three color toners (or four, if black is included) must be transferred in succession in the same apparatus. If the color pigments yellow, cyan and magenta then have different triboelectric effects on toner chargeability, it is not possible to include them as the sole colorant in a general toner base formulation. On the contrary, it can then be necessary to develop for each colorant a separate formulation for which, for example, the identity and amount of the charge control agent required must be specifically optimized. This procedure is accordingly very expensive and, in the case of color toners for process ink is an additional drawback on top of the problems described above.

The present invention therefore has for its object to develop a process for specifically influencing the triboelectric effect of azo pigments, in particular laked azo pigments, in electrophotographic toners or developers or in powders for surface coating. The process should not affect the coloristic and fastness properties of the particular azo pigment and, what is more, should not reduce the usual options, in the synthesis or in the aftertreatment of the azo pigment, to influence the coloristic and fastness characteristics of the azo pigment.

More particularly, there was a need to be able to render the particular azo pigment triboelectrically neutral. Triboelectrically neutral means that the pigment does not exert any influence on the chargeability of the particular toner or developer in which it is included, which in turn means that the adjustment of the triboelectric effect of the pigment must be possible in very small steps in order that it may be optimally fitted into the particular system in this way.

Furthermore, there is also interest in influencing the triboelectric effect of pigments for the use thereof in powder and powder coatings, in particular in triboelectrically or electrokinetically sprayed powder coatings, for the surface coating of articles made for example of metal, wood, plastics, glass, ceramics, concrete, textile materials, paper or rubber, since pigments can also have a crucial effect on the chargeability of powder coatings (DE-A No. 3,737,495).

It was particularly urgent to find a process for specifically influencing the triboelectric effect of azo pigments, in particular laked azo pigments, since on the one hand these pigments have an extremely high triboelectric effect and on the other such important pigments as for example, C.I. Pigment Red 48, 53 and 57 and C.I. Pigment Yellow 12, 17, 81 and 97 belong to this class of pigment.

It has now been found, surprisingly, that the triboelectric effect of azo pigments in electrophotographic toners or developers and in powders for surface coating can be influenced in a specific manner by adding to the azo pigments at the coupling reaction stage, at the laking (metal salt formation) stage or in the course of finishing at least one saltlike cationic compound of the general formulae

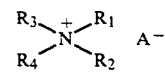 (1)

and/or

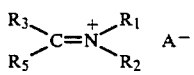 (2)

and/or

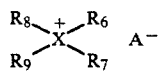 (3)

where in the case of the general formulae (1) and (2) $R_1$, $R_2$, $R_3$ and $R_4$ are independently of one another hydrogen atoms, straight-chain or branched alkyl groups of 1 to 30 carbon atoms, preferably of 1 to 22 carbon atoms, oxyethyl groups of the general formula $-(CH_2-CH_2-O)_n-R$, wherein R is a hydrogen atom or an alkyl ($C_1-C_4$) group or an acyl group, for example an acetyl, benzoyl or naphthoyl group and n is a number from 1 to 10, preferably from 1 to 4, monocyclic or polycyclic cycloaliphatic radicals of 5 to 12 carbon atoms, for example cyclopentyl or cyclohexyl groups, monocyclic or polycyclic aromatic radicals, for example phenyl, 1-naphthyl, 2-naphthyl, tolyl or biphenyl radicals, or araliphatic radicals, for example benzyl, which aliphatic, araliphatic and aromatic radicals may be substituted by hydroxyl, alkoxy($C_1-C_4$), primary, secondary or tertiary amino groups, for example N-monoalkyl-($C_1-C_4$)amino or N,N-dialkyl-($C_1-C_4$)amino groups, by acid amide or acid imide groups, preferably phthalimide or naphthalimide groups, or by fluorine, chlorine or bromine atoms, the aliphatic radicals in particular, by 1 to 33 fluorine atoms, $R_5$ is a hydrogen, fluorine, chlorine or bromine atom or an alkyl($C_1-C_6$), alkoxy($C_1-C_6$) or primary amino group, and $A^-$ is one equivalent of an anion, for example halide, preferably bromide or chloride, or sulfate, hydrogensulfate, hydroxide, tetrafluoroborate, hexafluorophosphate, thiocyanate, perchlorate, hexafluoroarsenate or phosphate, and where $R_1$ and $R_3$ can be part of a ring system of 5 to 7 carbon atoms which may be interrupted by 1 or 2 heteroatoms, for example a nitrogen, oxygen or sulfur atom, and contain 0 to 3 double bonds (examples of compounds of this type being pyridine and piperidine salts and derivatives thereof), specific compounds being for example hexadecyltrimethylammonium chloride, soyalkyltrimethylammonium chloride, cocoalkyldimethylbenzylammonium chloride, cocoalkyl-2,4-dichlorobenzyldimethylammonium chloride, stearyldimethylbenzylammonium chloride, dicocoalkyldimethylammonium chloride and ditallowfatalkyldimethylammonium chloride, and where in the case of the general formula (3) $R_6$, $R_7$, $R_8$ and $R_9$ are independently of one another hydrogen atoms, straight chain or branched alkyl groups of 1 to 30 carbon atoms, preferably 1 to 22 carbon atoms, monocyclic or polycyclic cycloaliphatic radicals of 5 to 12 carbon atoms, for example cyclopentyl or cyclohexyl, oxyethyl groups of the general formula $-(CH_2-CH_2-O)_n-R$, where n is a number from 1 to 10, preferably from 1 to 4, and R is a hydrogen atom, an alkyl ($C_1-C_4$) group or an acyl group, for example an acetyl, benzoyl or naphthoyl group, monocyclic or polycyclic aromatic radicals, for example a phenyl, 1-naphthyl, 2-naphthyl, tolyl or biphenyl radical, and/or araliphatic radicals, for example a benzyl radical, which aliphatic, aromatic and araliphatic radicals may be substituted by hydroxyl, alkoxy($C_1-C_4$), secondary or tertiary amino groups, for example monoalkyl($C_1-C_6$)amino or dialkyl($C_1-C_6$)amino groups, by acid amide groups, preferably aliphatic acid amide groups, for example the

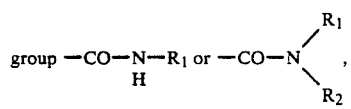

where $R_1$ and $R_2$ are alkyl($C_1-C_{30}$) groups, by acid imide groups, for example phthalimide or naphthalimide groups, the alkyl, cycloalkyl, aralkyl and aryl radicals for $R_1$ to $R_4$ being optionally substituted by fluorine, chlorine or bromine atoms, the aliphatic radicals in particular by 1 to 33 fluorine atoms, and where X is a phosphorus, arsenic or antimony atom, preferably a phosphorus atom, although if X is an arsenic or antimony atom at least one of the radicals $R_6$ to $R_9$ is not a hydrogen atom and $A^-$ is one equivalent of an anion, preferably of an inorganic anion, for example halide, preferably bromide or chloride, or sulfate, hydrogensulfate, hydroxide, tetrafluoroborate, hexafluorophosphate, thiocyanate, perchlorate, hexafluoroarsenate or phosphate.

Specific examples of compounds are tetraphenylphosphonium chloride, benzyltriphenylphosphonium chloride, methyltriphenylphosphonium bromide, tetrabutylphosphonium bromide, dodecyltributylphosphoniumbromide, phthalimidomethyltributylphosphonium bromide, hexadecyltributylphosphonium bromide and octadecyltributylphosphonium bromide.

The process according to the invention is applicable not only to monoazo pigments but also to disazo, trisazo, tetrakisazo and polyazo pigments.

By the addition of the saltlike, cationic compounds according to the invention at the coupling reaction stage, at the laking (metal salt formation) stage or in the course of finishing these pigments, the coloristic and fastness properties characteristic of the particular azo pigments present are only insignificantly affected, if at all.

The pigments which have been specifically triboelectrically influenced by the claimed process are in general homogeneously incorporated into the particular carrier material in a concentration between about 0.5 and about 15 percent by weight, preferably about 3 to about 8 percent by weight, typical carrier materials being in the case of electrophotographic toners and developers for example styrene, styrene acrylate, styrene butadiene, polyester and epoxy resins, and in the case of powder coatings epoxy, polyester and acrylic resins, individually or combined, and the carrier materials may contain further ingredients, for example waxes, charge control agents, specific curing agent components, or pigments, or these ingredients may be added after the pigment has been incorporated.

In the process according to the invention, the saltlike cationic compounds can be added to the pigment either before or in the course of the coupling reaction, in the course of the laking reaction in the case of laked azo pigments or in the course of an aftertreatment (finishing) of the azo pigment. The concentration of the added cationic compound being in general between 0.05 and 15%, preferably between 1 and 8%, suitable cationic compounds being in particular those which have a high thermostability and a solubility in water or in an aqueous medium of greater than 10 g/l.

General processes for preparing azo pigments are described in "Ullmanns Encyklopädie der Technischen Chemie", Volume 18, pages 661–695, Verlag Chemie, Weinheim, 1979.

A further advantage of the process according to the invention is that the triboelectrically active additives may be added at any desired stage of the pigment synthesis. By selecting the time of addition and the amount it is possible to optimize the triboelectric effect of the particular pigment. This makes it possible to influence the triboelectric effect of a laked or unlaked azo pigment in a specific manner and, what is more, to vary this effect in very small steps in order to optimize it in this way for the particular system. For instance, a test toner containing 5% Pigment Red 57:1 has for example a triboelectric charge of $-9$ $\mu$C/g (30 minutes activating time) or $-50$ $\mu$C/g (24hours activating time) [Example 20] without addition of specific saltlike cationic compounds.

An addition of 2% tributylhexadecylphosphonium bromide (TBHP) to the same pigment in the course of its laking reaction (metal salt formation) changes the charge of a similar test toner to $-6$ $\mu$C/g (30 minutes activating time) or $-44$ $\mu$C/g (24 hours activating time) [Example 1]; an addition of 4% of THBP in the course of the laking reaction changes the toner charge to $-3$ $\mu$C/g (30 minutes activating time) or $-38$ $\mu$C/g (24 hours activating time) [Example 2], and an addition of 8% of TBHP in the course of the laking reaction changes the toner charge to $+2$ $\mu$C/g (30 minutes activating time) or $-27$ $\mu$C/g (24 hours activating time) [Example 3].

If 4% of TBHP are added to the same pigment in the course of its synthesis at the coupling reaction stage instead of in the course of the laking reaction, the toner charge changes to $+1$ $\mu$C/g (30 minutes activating time) or $-28$ $\mu$C/g (24 hours activating time) [Example 7]; a 4% addition of THBP to the pigment in the course of the pigment aftertreatment changes the toner charge to $\pm0$ $\mu$C/g (30 minutes activating time) or $-28$ $\mu$C/g (24 hours activating time) [Example 11]. A similarly specific influence on the triboelectric effect of an azo pigment is obtainable if an ammonium or immonium salt is added to the pigments.

By specifically influencing the triboelectric effect of the agents it may also be possible to dispense with the addition of a separate charge control agent. This radically eliminates the problems which can arise on addition of separate charge control agents, such as undesirable effect on the hue, inhomogeneous distribution of the control agent in the toner or gradual migration of the control agent out of the toner.

The pigments which have been specifically triboelectrically influenced by the process according to the invention are homogeneously incorporated in the conventional manner into the carrier material, for example by mixing and extruding or by kneading. The pigments may be added either as dried and ground powders, as dispersions, press cakes or master batches in some other suitable form. Similarly, the pigments may basically even be added at the preparation stage of the particular carrier materials (resins), i.e. in the course of the polymerization or polycondensation thereof.

The magnitude of the electrostatic charge on electrophotographic toners in which pigments which have been triboelectrically specifically influenced by the process claimed according to the invention have been homogeneously incorporated, has been measured on standard systems under identical conditions (such as equal dispersing times, equal particle size distribution, equal particle shape) at 23° C. and 50% relative humidity. The toner in a two-component developer is activated by tumbling the toner with a carrier (3 parts of toner per 97 parts of carrier) on a rollbank (150 revolutions per minute).

A Q/M value is greatly influenced by the particle size. Great rare was therefore taken to ensure that the toner samples indicated in the examples below, which were obtained by sifting, were uniform in respect of the particle size distribution.

The Examples which follow serve to illustrate the invention without limiting it. Parts are by weight.

EXAMPLE 1

5 Parts of C.I. Pigment Red 57:1 to which 2% of tributylhexadecylphosphonium bromide (TBHP) has been added in the course of the coupling reaction (for the pigment synthesis, see below) were dispersed in 95 parts of a toner binder ( ®Dialec S 309 from Diamond Shamrock (styrenemethacryloyl copolymer)) by means of a kneader from Werner & Pfleiderer (Stuttgart) in the course of 45 minutes. The dispersion was then ground on the universal laboratory mill 100 LU (from Alpine, Augsburg) and then classified on the 100 MZR centrifugal sifter (from Alpine).

The desired particle size fraction was activated with a 90 $\mu$m type xerographic carrier from Materials Inc. comprising magnetite particles of 50 to 200 $\mu$m in size coated with 90:10 styrene-methacrylate.

The measurement is carried out using a customary Q/M measurement set up (cf. J. H. Dessauer, H. E. Clark, "Xerography and Related Processes", Focal Press, N.Y. 1965, page 289). By using a seive of mesh size 25 $\mu$m (508 mesh per inch), from Gebrüder Kufferath, Düren, it was ensured that no carrier can become entrained in the course of the toner blowoffs.

The following Q/M values [$\mu$C/g] were measured as a function of the activating time:

| Activating time | [$\mu$C/g] |
|---|---|
| 30 min | $-6$ |
| 2 hours | $-34$ |
| 24 hours | $-44$ |

Pigment synthesis 37.4 Parts of 4-aminotoluene—3-sulfonic acid were dissolved in 500 parts of water and 26.1 parts of 33% strength sodium hydroxide solution. Following the addition of 4.5 parts of a coupling aid based on modified Novolak alkoxylates prepared as described in European Patent Specification No. 0,065,751, Example 3.4, and ice cooling to 0° C., 56 parts of 31% strength hydrochloric acid are added, and this is followed at 0 to 5° C.

by diazotization with 36.4 parts of 38% strength sodium nitrite solution.

Furthermore, 39 parts of β-hydroxynaphthoic acid were dissolved in 1000 parts of water and 70 parts of 33% strength sodium hydroxide solution. The diazo suspension is added to this solution in the course of 30 minutes. After addition of a solution of 20 parts of disproportionate rosin in 200 parts of water and 8 parts of 33% strength sodium hydroxide solution and a solution of 2.25 parts of tributylhexadecylphosphonium bromide (TBHP) in 25 parts of water, the suspension is brought with dilute hydrochloric acid to pH 9.0. To effect laking, a solution of 35 parts of calcium chloride in 100 parts of water is then added dropwise. This is followed by heating to 80–85° C., stirring at that temperature for 30 minutes, filtering off with suction, washing with water and drying at 80° C., giving 112 parts of a red lake.

EXAMPLE 2

5 Parts of C.I. Pigment Red 57:1 to which 4% of TBHP had been added in the course of the laking reaction (for the synthesis of the pigment, see below) were incorporated into a toner as described in Example 1. The following Q/M values [$\mu$C/g] were measured as a function of the activating time:

| Activating time | ($\mu$C/g) |
| --- | --- |
| 30 minutes | −3 |
| 2 hours | −25 |
| 24 hours | −38 |

Pigment synthesis

The pigment was synthesized as described in Example 1, except that the 2.25 parts of TBHP were replaced by 4.5 parts of TBHP, affording 114 parts of a red lake.

EXAMPLE 3

5 Parts of C.I. Pigment Red 57:1 to which 8% of TBHP had been added in the course of the laking reaction (for the synthesis of the pigment, see below) were incorporated into a toner as described in Example 1. The following Q/M values [$\mu$C/g] were measured as a function of the activating time:

| Activating time | [$\mu$C/g] |
| --- | --- |
| 30 minutes | +2 |
| 2 hours | −12 |
| 24 hours | −27 |

Pigment synthesis:

The pigment was synthesized as described in Example 1 except that the 2.25 parts of TBHP were replaced by 9 parts of TBHP, affording 118 parts of a red lake.

EXAMPLE 4

5 Parts of C.I. Pigment Red 57:1 to which 2% of TBHP had been added in the course of the laking reaction (for the synthesis of the pigment, see below) were incorporated into a toner as described in Example 1. The following Q/M values [$\mu$C/g] were measured as a function of the activating time:

| Activating time | [$\mu$C/g] |
| --- | --- |
| 30 minutes | −6 |
| 2 hours | −28 |
| 24 hours | −46 |

Pigment synthesis:

The pigment was synthesized as described in Example 1, except that no coupling aid was added, affording 108 parts of red lake.

EXAMPLE 5

5 Parts of C.I. Pigment Red 57:1 to which 4% of TBHP had been added in the course of the laking reaction (for the synthesis of the pigment, see below) were incorporated into a toner as described in Example 1. The following Q/M values [$\mu$C/g] were measured as a function of the activating time:

| Activating time | [$\mu$C/g] |
| --- | --- |
| 30 minutes | +2 |
| 2 hours | −21 |
| 24 hours | −31 |

Pigment synthesis:

The pigment was synthesized as described in Example 1, except that no coupling aid was added, affording 110 parts of a red lake.

EXAMPLE 6

5 Parts of C.I. Pigment Red 57:1 to which 8% of TBHP had been added in the course of the laking reaction (for the synthesis of the pigment, see below) were incorporated into a toner as described in Example 1. The following Q/M values [$\mu$C/g] were measured as a function of the activating time:

| Activating time | [$\mu$C/g] |
| --- | --- |
| 30 minutes | +3 |
| 2 hours | −20 |
| 24 hours | −30 |

Pigment synthesis:

The pigment was synthesized as described in Example 3, except that no coupling aid was added, affording 114 parts of a red lake.

EXAMPLE 7

5 Parts of C.I. Pigment Red 57:1 to which 4% of TBHP had been added before the laking reaction (for the synthesis of the pigment, see below) were incorporated into a toner as described in Example 1. The following Q/M values $\mu$C/g] were measured as a function of the activating time:

| Activating time | [$\mu$C/g] |
| --- | --- |
| 30 minutes | +1 |
| 2 hours | −24 |
| 24 hours | −28 |

Pigment synthesis:

37.4 Parts of 4-aminotoluene−3-sulfonic acid were dissolved in 500 parts of water and 26.1 parts of 33% strength sodium hydroxide solution. Following the addition of 4.5 parts of a coupling aid based on modified Novolak alkoxylates prepared as described in European Patent Specification No. 0,065,751, Example 3.4, and ice cooling to 0° C., 56 parts of 31% strength hydrochloric acid were added, and this was followed at 0 to 5° C. by diazotization with 36.4 parts of 38% strength sodium nitrite solution.

Furthermore, 39 parts of β-hydroxynaphthoic acid were dissolved in 1000 parts of water and 70 parts of 33% strength sodium hydroxide solution. The diazo suspension, to which a solution of 4.5 parts TBHP in 25 parts of water had previously been added, was added to this solution in the course of 30 minutes. After addition of a solution of 20 parts of disproportionated rosin in 200 parts of water and 8 parts of 33% strength sodium hydroxide solution, the suspension was brought with dilute hydrochloric acid to pH 9.0. To effect laking, a solution of 35 parts of calcium chloride in 100 parts of water was then added dropwise. This was followed by heating to 80–85° C., stirring at that temperature for 30 minutes, filtering off with suction, washing with water and drying at 80° C., giving 114 parts of a red lake.

EXAMPLE 8

5 Parts of C.I. Pigment Red 57:1 to which 8% of TBHP had been added before the coupling reaction (for the synthesis of the pigment, see below) were incorporated into a toner as described in Example 1. The following Q/M values [μC/g] were measured as a function of the activating time:

| Activating time | [μC/g] |
|---|---|
| 30 minutes | +1 |
| 2 hours | −16 |
| 24 hours | −28 |

Pigment synthesis:
The pigment was synthesized as described in Example 7, except that the 4.5 parts of TBHP were replaced by 9 parts of TBHP, affording 118 parts of a red lake.

EXAMPLE 9

5 Parts of C.I. Pigment Red 57:1 to which 4% of TBHP had been added before the coupling reaction (for the synthesis of the pigment, see below) were incorporated into a toner as described in Example 1. The following Q/M values [μC/g] were measured as a function of the activating time:

| Activating time | [μC/g] |
|---|---|
| 30 minutes | −8 |
| 2 hours | −30 |
| 24 hours | −30 |

Pigment synthesis:
The pigment was synthesized as described in Example 7, except that no rosin was added, affording 93 parts of a red lake.

EXAMPLE 10

5 Parts of C.I. Pigment Red 57:1 to which 8% of TBHP had been added before the coupling reaction (for the synthesis of the pigment, see below) were incorporated into a toner as described in Example 1. The following Q/M values [μC/g] were measured as a function of the activating time:

| Activating time | [μC/g] |
|---|---|
| 30 minutes | −1 |
| 2 hours | −19 |
| 24 hours | −26 |

Pigment synthesis:
The pigment was synthesized as described in Example 9, except that the 4.5 parts of TBHP were replaced by 9 parts of TBHP, affording 98 parts of a red lake.

EXAMPLE 11

5 Parts of C.I. Pigment Red 57:1 in the course of the aftertreatment of which 4% of TBHP had been added (for the synthesis of the pigment, see below) were incorporated into a toner as described in Example 1. The following Q/M values μC/g) were measured as a function of the activating time:

| Activating time | [μC/g] |
|---|---|
| 30 minutes | ±0 |
| 2 hours | −17 |
| 24 hours | −28 |

Pigment synthesis:
37.4 Parts of 4-aminotoluene−3-sulfonic acid were dissolved in 500 parts of water and 26.1 parts of 33% strength sodium hydroxide solution. Following the addition of 4.5 parts of a coupling aid based on modified Novolak alkoxylates prepared as described in European Patent Specification No. 0,065,751, Example 3.4, and ice cooling to 0° C., 56 parts of 31% strength hydrochloric acid were added, and this was followed at 0 to 5° C. by diazotization with 36.4 parts of 38% strength sodium nitrite solution.

Furthermore, 39 parts of β-hydroxynaphthoic acid were dissolved in 1,000 parts of water and 70 parts of 33% strength sodium hydroxide solution. The diazo suspension was added to this solution in the course of 30 minutes. After addition of a solution of 20 parts of disproportionated rosin in 200 parts of water and 8 parts of 33% strength sodium hydroxide solution, the suspension was brought with dilute hydrochloric acid to pH 9.0. To effect laking, after the addition of a solution of 2.25 parts cf THBP in 25 parts of water, a solution of 35 parts of calcium chloride in 100 parts of water was then added dropwise. This was followed by heating to 80–85° C., stirring at that temperature for 30 minutes, filtering off with suction, washing with water and drying at 80° C., giving 114 parts of a red lake.

EXAMPLE 12

5 Parts of C.I. Pigment Red 57:1 in the course of the aftertreatment of which 8% of TBHP was added (for the synthesis of the pigment, see below) were incorporated into a toner as described in Example 1. The following Q/M values [μC/g] were measured as a function of the activating time:

| Activating time | [μC/g] |
|---|---|
| 30 minutes | +3 |
| 2 hours | −12 |
| 24 hours | −27 |

Pigment synthesis:

The pigment was synthesized as described in Example 11, except that the 4.5 parts of TBHP were replaced by 9 parts of TBHP, affording 118 parts of red lake.

EXAMPLE 13

5 Parts of C.I. Pigment Red 57:1 in the course of the aftertreatment of which 4% of TBHP had been added (for the synthesis of the pigment, see below) were incorporated into a toner as described in Example 1. The following Q/M values [µC/g] were measured as a function of the activating time:

| Activating time | [µC/g] |
| --- | --- |
| 30 minutes | −10 |
| 2 hours | −27 |
| 24 hours | −32 |

Pigment synthesis:

The pigment was synthesized as described in Example 11, except that no rosin was added, affording 93 parts of a red lake.

EXAMPLE 14

5 Parts of C.I. Pigment Red 57:1 in the course of the aftertreatment of which 8% of TBHP had been added (for the synthesis of the pigment, see below) were incorporated into a toner as described in Example 1. The following Q/M values [µC/g] were measured as a function of the activating time:

| Activating time | [µC/g] |
| --- | --- |
| 30 minutes | −3 |
| 2 hours | −19 |
| 24 hours | −24 |

Pigment synthesis:

The pigment was synthesized as described in Example 12, except that no rosin was added, affording 98 parts of a red lake.

EXAMPLE 15

5 Parts of C.I. Pigment Red 57:1 to which 4% of cocoalkyldimethylbenzylammonium chloride (CDBA) had been added in the course of the laking reaction (for the synthesis of the pigment, see below) were incorporated into a toner as described in Example 1.

The following Q/M values (µC/g) were measured as a function of the activating time:

| Activating time | [µC/g] |
| --- | --- |
| 30 min | −5 |
| 2 hours | −27 |
| 24 hours | −37 |

Pigment synthesis:

The pigment was synthesized as described in Example 2, except that the 4.5 parts of TBHP were replaced by 4.5 parts of CDBA, affording 114 parts of a red lake.

EXAMPLE 16

5 Parts of C.I. Pigment Red 57:1 to which 8% of CDBA had been added in the course of the laking reaction (for the synthesis of the pigment, see below) were incorporated into a toner as described in Example 1.

The following Q/M values [µC/g] were measured as a function of the activating time:

| Activating time | [µC/g] |
| --- | --- |
| 30 min | ±0 |
| 2 hours | −15 |
| 24 hours | −22 |

Pigment synthesis:

The pigment was synthesized as described in Example 15, except that the 4.5 parts of CDBA were replaced by 9 parts of CDBA, affording 118 parts of a red lake.

EXAMPLE 17

5 Parts of C.I. Pigment Red 57:1, to which 4% of CDBA had been added in the course of the laking reaction (for the synthesis of the pigment, see below) were incorporated into a toner as described in Example 1. The following Q/M values [µC/g] were measured as a function of the activating time:

| Activating time | [µC/g] |
| --- | --- |
| 30 min | −13 |
| 2 hours | −34 |
| 24 hours | −40 |

Pigment synthesis:

The pigment was synthesized as described in Example 15, except that no rosin was added, affording 93 parts of a red lake.

EXAMPLE 18

5 Parts of C.I. Pigment Red 57:1 to which 8% of cocoalkyldimethylbenzylammonium chloride (CDBA) had been added in the course of the laking reaction (for the synthesis of the pigment, see below) were incorporated into a toner as described in Example 1.

The following Q/M values (µC/g) were measured as a function of the activating time:

| Activating time | [µC/g] |
| --- | --- |
| 30 min | −9 |
| 2 hours | −20 |
| 24 hours | −28 |

Pigment synthesis:

The pigment was synthesized as described in Example 17, except that the 4.5 parts of CDBA were replaced by 9 parts of CDBA, affording 98 parts of a red lake.

EXAMPLE 19

5 Parts of C.I. Pigment Red 57:1 to which 8% of distearyldimethylammonium chloride (DDA) had been added in the course of the laking reaction (for the synthesis of the pigment, see below) were incorporated into a toner as described in Example 1.

The following Q/M values (µC/g) were measured as a function of the activating time:

| Activating time | [µC/g] |
| --- | --- |
| 30 min | −11 |
| 2 hours | −31 |
| 24 hours | −44 |

Pigment synthesis:
The pigment was synthesized as described in Example 3, except that the 9 parts of TBHP were replaced by 9 parts of DDA, affording 118 parts of red lake.

EXAMPLE 20

(COMPARATIVE EXAMPLE)

5 Parts of a C.I. Pigment Red 57:1 which had not been specifically influenced triboelectrically (for the synthesis of the pigment, see below) were incorporated into a toner as described in Example 1.

The following Q/M values [$\mu$C/g] were measured as a function of the activating time:

| Activating time | [$\mu$C/g] |
| --- | --- |
| 30 minutes | −9 |
| 2 hours | −36 |
| 24 hours | −50 |

Pigment synthesis:
The pigment was synthesized as described in Example 1, except that no TBHP was added, affording 110 parts of a red lake.

EXAMPLE 21

(COMPARATIVE EXAMPLE)

5 Parts of a C.I. Pigment Red 57:1 which had not been specifically influenced triboelectrically were incorporated into a toner as described in Example 1.

The following Q/M values [$\mu$C/g] were measured as a function of the activating time:

| Activating time | [$\mu$C/g] |
| --- | --- |
| 30 minutes | −20 |
| 2 hours | −44 |
| 24 hours | −52 |

Pigment synthesis:
The pigment was synthesized as described in Example 1, except that no TBHP or rosin were added, affording 89 parts of a red lake.

EXAMPLE 22

5 Parts of C.I.
Pigment Red 48:2 to which 4% of TBHP had been added in the course of the laking reaction (for the synthesis of the pigment, see below) were incorporated into a toner as described in Example 1. The following Q/M values [$\mu$C/g] were measured as a function of the activating time:

| Activating time | [$\mu$C/g] |
| --- | --- |
| 30 minutes | +4 |
| 2 hours | −6 |
| 24 hours | −13 |

Pigment synthesis:
59 Parts of 2-amino-4-chloro-5-methylbenzenesulfonic acid were dissolved in 600 parts of water and 34.8 parts of 33% strength sodium hydroxide solution at 75° C. After addition of 6 parts of a coupling aid based on modified Novolak alkoxylates prepared as described in European Patent Specification No. 0,065,751, Example 3.4, 75 parts of 31% strength hydrochloric acid were added. After ice cooling to 0° C., diazotization was carried out with 48.5 parts of 38% strength sodium nitrite solution.

Furthermore, 52 parts of $\beta$-hydroxynaphthoic acid were dissolved in 1,300 parts of water and 108 parts of 33% strength sodium hydroxide solution. The diazo suspension was added to this solution in the course of 30 minutes. After addition of a solution of 6 parts of tributylhexadecylphosphonium bromide in 60 parts of water and a solution of 20 parts of disproportionated rosin in 200 parts of water and 8 parts of sodium hydroxide, a solution of 35 parts of calcium chloride in 100 parts of water was added dropwise to effect laking. This was followed by heating to 80° C., filtering off, washing with water and drying at 80° C., giving 139 parts of a red lake.

EXAMPLE 23

(COMPARATIVE EXAMPLE)

5 Parts of a C.I. Pigment Red 48:2 which had not been specifically influenced triboelectrically were incorporated into a toner as described in Example 1.

The following Q/M values [$\mu$C/g] were measured as a function of the activating time:

| Activating time | [$\mu$C/g] |
| --- | --- |
| 30 minutes | +1 |
| 2 hours | −9 |
| 24 hours | −16 |

Pigment synthesis:
The pigment was synthesized as described in Example 22, except that no TBHP was added, affording 133 parts of a red lake.

EXAMPLE 24

5 Parts of a C.I. Pigment Red 48:4 to which 2% of TBHP had been added in the course of the laking reaction (for the synthesis of the pigment, see below) were incorporated into a toner as described in Example 1. The following Q/M values [$\mu$C/g] were measured as a function of the activating time:

| Activating time | ($\mu$C/g) |
| --- | --- |
| 30 minutes | −4 |
| 2 hours | −15 |
| 24 hours | −18 |

Pigment synthesis:
59 Parts of 2-amino-4-chloro-5-methylbenzenesulfonic acid were dissolved in 800 parts of water and 34.8 parts of 33% strength sodium hydroxide solution at 70 to 75° C. and, after ice cooling to 30° C., admixed with 48.5 parts of sodium nitrite solution. To effect diazotization, a solution of 78.5 parts of 31% strength hydrochloric acid, 200 parts of water and 800 parts of ice were added at −5 to +5° C.

Furthermore, 52 parts of -hydroxynaphthoic acid were dissolved in 1,120 parts of water and 108 parts of 33% strength sodium hydroxide solution and, following addition of 90 parts of sodium carbonate, ice cooled to 5° C. The diazo suspension was then added to this solution in the course of 1 hour. Stirring was then continued until the coupling reaction had ended, when the temperature was raised to 80° C. and stirring was continued at 80° C. for 1 hour.

The mixture was finally filtered and washed. The press cake was suspended in 800 parts of water and following the addition of 12 parts of tributylhexadecylphosphonium bromide admixed with 66.6 parts of manganese sulfate to effect laking. The mixture was then heated to 98 to 100° C., stirred at that temperature for 15 minutes and filtered, and the product was washed and dried at 70° C.

144 parts of a red lake were obtained.

EXAMPLE 25

5 Parts of a C.I. Pigment Red 48:4 which had not been specifically influenced triboelectrically were incorporated into a toner as described in Example 1.

The following Q/M values [μC/g] were measured as a function of the activating time:

| Activating time | [μC/g] |
| --- | --- |
| 30 minutes | −9 |
| 2 hours | −17 |
| 24 hours | −23 |

Pigment synthesis:

The pigment was synthesized as described in Example 24, except that no TBHP was added, affording 142 parts of a red lake.

EXAMPLE 26

5 Parts of a C.I. Pigment Red 53:1, to which 2% of TBHP had been added in the course of the laking reaction (for the synthesis of the pigment see below) were incorporated into a toner as described in Example 1. The following Q/M values [μC/g] were measured as a function of the activating time:

| Activating time | [μC/g] |
| --- | --- |
| 30 minutes | −10 |
| 2 hours | −26 |
| 24 hours | −31 |

Pigment synthesis:

66.45 Parts of 2-amino-4-methyl-5-chlorobenzenesulfonic acid were suspended in 700 parts of water and 45 parts of 31% strength hydrochloric acid and diazotized at 20 to 25° C. by the addition of 54.5 parts of sodium nitrite solution.

Furthermore, 45 parts of β-naphthol were dissolved in 300 parts of water and 40.8 parts of sodium hydroxide solution at 20 to 25° C. This solution was then added to the diazo suspension in the course of 1 hour. After the coupling reaction had ended, 3 parts of tributylhexadecylphosphonium bromide (TBHP) were added, followed by 40 parts of crystalline barium chloride. The product was laked by heating to 80 to 85° C. The mixture was then stirrer at 80 to 85° C. for a further 15 minutes and filtered, and the product was washed and dried, leaving 133 parts of a red lake.

EXAMPLE 27

(COMPARATIVE EXAMPLE)

5 Parts of a C.I. Pigment Red 53:1 which had not been specifically influenced triboelectrically was incorporated into a toner as described in Example 1.

The following Q/M values (μC/g) were measured as a function of the activating time:

| Activating time | [μC/g] |
| --- | --- |
| 30 minutes | −25 |
| 2 hours | −38 |
| 24 hours | −43 |

Pigment synthesis:

The pigment was synthesized as described in Example 26 except that no TBHP was added, affording 130 parts of a red lake.

EXAMPLE 28

5 Parts of C.I. Pigment Yellow 12 to which 4% of TBHP had been added in the course of the coupling reaction (for the pigment synthesis, see below) were incorporated into a toner as described in Example 1.

The following Q/M values [μC/g] were measured as a function of the activating time.

| Activating time | [μC/g] |
| --- | --- |
| 30 minutes | +9 |
| 2 hours | +2 |
| 24 hours | −3 |

Pigment synthesis:

50.6 Parts of 3,3'-dichlorobenzidine were suspended in 120 parts of 31% strength hydrochloric acid and 250 parts of water and converted into 3,3'-dichlorobenzidine dihydrochloride. 72.7 parts of 38% strength sodium nitrite solution were then added at 0 to 5° C. to effect tetrazotization in a conventional manner. The tetrazonium salt solution was treated with 6 parts of kieselguhr and then filtered, and the filtrate was adjusted to a temperature of 10° C. and to a volume of 800 parts.

74 Parts of acetylacetanilide were slurried in 1,600 parts of water and dissolved in 81 parts of 33% strength sodium hydroxide solution. Following addition of 6.2 parts of tributylhexadecylphosphonium bromide (TBHP) the coupling component was reprecipitated by the addition of 46 parts of glacial acetic acid and then coupled at 20 to 25° C. by the addition of the tetrazo solution in the course of 2 hours during which the pH was maintained at a constant value of 4.5 by the simultaneous addition of 6% strength sodium hydroxide solution. After the coupling reaction had ended, the mixture was aftertreated at 90° C. for 15 minutes and filtered with suction, and the filter residue was washed with water until neutral and salt-free and dried at 80° C. in a circulating air cabinet. 133 parts of a yellow pigment were obtained.

EXAMPLE 29

(COMPARATIVE EXAMPLE)

5 Parts of a C.I. Pigment Yellow 12 which had not been specifically influenced triboelectrically were incorporated into a toner as described in Example 1.

The following Q/M values μC/g] were measured as a function of the activating time:

| Activating time | [μC/g] |
| --- | --- |
| 30 minutes | −9 |
| 2 hours | −22 |
| 24 hours | −39 |

Pigment synthesis:

The pigment was synthesized as described in Example 28, except that no TBHP was added, affording 127 parts of a yellow pigment.

EXAMPLE 30

5 Parts of C.I. Pigment Yellow 14 to which 5% of TBHP had been added in the course of the coupling reaction (for the synthesis of the pigment, see below) were incorporated into a toner as described in Example 1. The following Q/M values [$\mu$C/g] were measured as a function of the activating time:

| Activating time | [$\mu$C/g] |
|---|---|
| 30 minutes | +3 |
| 2 hours | ±0 |
| 24 hours | −1 |

Pigment synthesis:

78 Parts of 2,4,5-trichloroaniline were colloid-ground in the presence of water and 0.6 part of a secondary alkylsulfonate (®Hostaperm SAS 30). After addition of 450 parts of 31% strength hydrochloric acid, the mixture was stirred for 5 hours and then rapidly diazotized at 0 to 10° C. by the addition of 72.5 parts of 38% strength sodium nitrite solution. After stirring for one hour, excess nitrite was destroyed with a little amidosulfonic acid. 5 parts of kieselguhr were then added for clarification. 110 parts of Naphtol AS-D were dissolved in 350 parts of water and 76 parts of 33% strength sodium hydroxide solution at 75 to 80° C. The solution was cooled with iced water to 15° C. and adjusted to a volume of 1.7 l. After addition of 10 parts of tributylhexadecylphosphonium bromide, the Naphtol AS-D was precipitated by the rapid addition of 86 parts of 31% strength hydrochloric acid. The precipitation was heated to 30° C. The diazonium salt solution was then added at 30° C. in the course of 1 hour. The mixture was subsequently stirred for 30 minutes, then slowly heated to 70° C. and subsequently stirred at 65 to 70° C. for about 2 hours until any excess diazonium compound had disappeared. The product was then filtered off, washed with water until neutral and salt-free and dried at 80° C. in a circulating air cabinet, leaving 192 parts of a red pigment.

EXAMPLE 31

(COMPARATIVE EXAMPLE)

5 Parts of a C.I. Pigment Red which had not been specifically influenced triboelectrically were incorporated into a toner as described in Example 1.

The following Q/M values [$\mu$C/g] were measured as a function of the activating time:

| Activating time | [$\mu$C/g] |
|---|---|
| 30 minutes | −9 |
| 2 hours | −17 |
| 24 hours | −29 |

Pigment synthesis:

The pigment was synthesized as described in Example 30, except that no TBHP was added, affording 182 parts of a red pigment.

EXAMPLE 32

5 parts of C.I. Pigment Yellow 17, to which 4% of TBHP had been added before the coupling reaction (for the synthesis of the pigment, see below) were incorporated into a toner as described in Example 1.

The following Q/M values [$\mu$C/g] were measured as a function of the activating time:

| Activating time | [$\mu$C/g] |
|---|---|
| 30 minutes | +23 |
| 2 hours | +14 |
| 24 hours | +2 |

Pigment synthesis:

The tetrazonium salt solution was prepared as described in Example 28 (C.I. Pigment Yellow 12).

86 parts of acetoacetoanisidide were slurried in 1,000 parts of water and dissolved by the addition of 108 parts of 33% strength sodium hydroxide solution. After addition of a solution of 10 parts of a resin soap in 30 parts of water and 6.9 parts of tributylhexadecylphosphonium bromide, the coupling component was precipitated at 10° C. by the addition of 56.6 parts of glacial acetic acid. This was followed by addition of the tetrazonium salt solution to effect coupling at 20 to 25° C. in the course of 2 hours, during which the pH dropped from pH 6.4 to pH 3.8. The mixture was then heated to 90° C., stirred at 90° C. for 30 minutes and filtered with suction, and the product was washed with water until neutral and salt-free and dried at 70° C. in circulating air cabinet. 150 parts of a yellow pigment were obtained.

EXAMPLE 33

(COMPARATIVE EXAMPLE)

5 Parts of a C.I. Pigment Yellow 17 which had not been specifically influenced triboelectrically were incorporated into a toner as described in Example 1.

The following Q/M values [$\mu$C/g] were measured as a function of the activating time:

| Activating time | [$\mu$C/g] |
|---|---|
| 30 minutes | −4 |
| 2 hours | −15 |
| 24 hours | −26 |

Pigment synthesis:

The Pigment was synthesized as described in Example 32, except that no TBHP was added, affording 143 parts of a yellow pigment.

EXAMPLE 34

5 parts of C.I. Pigment Yellow 81 to which 4% of TBHP had been added before the coupling reaction (for the synthesis of the pigment, see below) were incorporated into a toner as described in Example 1.

The following Q/M values [$\mu$C/g] were measured as a function of the activating time:

| Activating time | [$\mu$C/g] |
|---|---|
| 30 minutes | +8 |
| 2 hours | +1 |
| 24 hours | −1 |

Pigment synthesis:

80.5 Parts of tetrachlorobenzidine were suspended with 235 parts of 31% strength hydrochloric acid and rapidly tetrazotized at 0 to 10° C. by the addition of 90.8 parts of 38% strength sodium nitrite solution.

106 Parts of acetoacet-m-xylidide were dissolved in 2000 parts of water and 67.5 parts of 33% strength sodium hydroxide solution and, after the addition of 9 parts of tributylhexadecylphosphonium bromide (TBHP), reprecipitated at 10° C. with 52 parts of glacial acetic acid. The 15 mixture was then coupled at 15 to 20° C. by the addition of the tetrazonium salt solution in the course of 1½ hours during which the pH was kept at a constant 3.9 to 4.0 by the addition of 15% strength sodium acetate solution. The mixture was then stirred for 15 minutes, heated to 98° C., stirred at 98° C. for 30 minutes, cooled to 70° C. and filtered, and the product was washed with water until neutral and salt-free and dried at 80° C. in a circulating air cabinet.

192 parts of a yellow pigment were obtained.

EXAMPLE 35

(COMPARATIVE EXAMPLE)

5 Parts of a C.I. Pigment Yellow 81 which had not been specifically influenced triboelectrically (for the synthesis of the pigment, see below) were incorporated into a toner as described in Example 1.

The following Q/M values [$\mu$C/g] were measured as a function of the activating time:

| Activating time | [$\mu$C/g] |
|---|---|
| 30 minutes | −1 |
| 2 hours | −8 |
| 24 hours | −18 |

Pigment synthesis:

The pigment was synthesized as described in Example 34, except that no TBHP was added, affording 183 parts of a yellow pigment.

EXAMPLE 36

5 Parts of C.I. Pigment Yellow 97 to whose synthesis 4% of TBHP had been added before the coupling reaction (for the synthesis of the pigment, see below) were incorporated into a toner as described in Example 1.

The following Q/M values [$\mu$C/g] were measured as a function of the activating time:

| Activating time | [$\mu$C/g] |
|---|---|
| 30 minutes | +5 |
| 2 hours | ±0 |
| 24 hours | ±0 |

Pigment synthesis:

102.7 Parts of quinone base sulfanilide(2,5-dimethoxy-4-phenylsulfamoyl aniline) were suspended with 115.5 parts of hydrochloric acid and 670 parts of water and diazotized at 15° C. by the addition of 59 parts of 38% strength sodium nitrite solution.

100 Parts of Naphtol AS-IRG were dissolved in 500 parts of water and 54 parts of 33% strength sodium hydroxide solution. After clarification, the solution was added to a 0° C. solution of 670 parts of water, 35 parts of glacial acetic acid and 9 parts of tributylhexadecylphosphonium bromide (TBHP). The diazonium salt solution was then added at 20° C. while a pH of 6.1 to 6.2 was constantly maintained by the simultaneous addition of 6% strength sodium hydroxide solution. The ready-prepared coupling was then made alkaline to phenolphthalein with 90 parts of 33% strength sodium hydroxide solution, heated to 98° C., stirred at 98° C. for 30 minutes, cooled to 70° C. and filtered and the filter residue was washed with water until neutral and salt-free and dried at 80° C. in a circulating air cabinet.

198 parts of a yellow pigment were obtained.

EXAMPLE 37

(COMPARATIVE EXAMPLE)

5 Parts of a C.I. Pigment Yellow 97 which had not been specifically influenced triboelectrically were incorporated into a toner as described in Example 1.

The following Q/M values [$\mu$C/g] were measured as a function of the activating time:

| Activating time | [$\mu$C/g] |
|---|---|
| 30 minutes | −3 |
| 2 hours | −10 |
| 24 hours | −17 |

Pigment synthesis:

The pigment was synthesized as described in Example 36, except that no TBHP was added, affording 189 parts of a yellow pigment.

EXAMPLE 38

5 Parts of a yellow azo pigment to whose synthesis 4% of TBHP had been added before the coupling reaction (for the synthesis of the pigment, see below) were incorporated into a toner as described in Example 1.

The following Q/M values [$\mu$C/g] were measured as a function of the activating time:

| Activating time | [$\mu$C/g] |
|---|---|
| 30 minutes | −6 |
| 2 hours | −6 |
| 24 hours | −6 |

Pigment synthesis:

76.5 Parts of o-nitroaniline-p-sulfonic acid were suspended in 105 parts of water and 124 parts of 31% strength hydrochloric acid, and, after ice cooling to 0° C., diazotized by the addition of 64.8 parts of sodium nitrite solution.

66 Parts of acetoacetanilide were dissolved in 850 parts of water by the addition of 55.5 parts of 33% strength sodium hydroxide solution and, after the addition of 6 parts of tributylhexadecylphosphonium bromide, reprecipitated with 31.5 parts of glacial acetic acid. The diazonium salt suspension was then rapidly added at 12 to 15° C. to this precipitation, and the coupling reaction was completed by adjusting the pH with 400 parts of 10% strength sodium carbonate solution to pH 6. The mixture was then heated to 80° C., stirred at 80° C. for 15 minutes, and filtered, and the filter residue was washed and dried at 70° C. 142 parts of a yellow powder of the formula

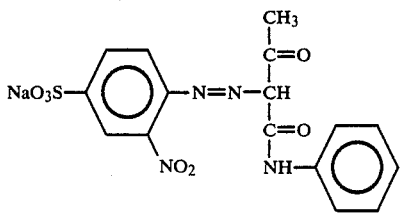

were obtained.

EXAMPLE 39

(COMPARATIVE EXAMPLE)

5 Parts of a yellow azo pigment which had not been specifically influenced triboelectrically were incorporated into a toner as described in Example 1. The following Q/M values [μC/g] were measured as a function of the activating time:

| Activating time | [μC/g] |
|---|---|
| 30 minutes | −8 |
| 2 hours | −10 |
| 24 hours | −10 |

Pigment synthesis:

The pigment was synthesized as described in Example 37, except that no TBHP was added, affording 140 parts of a yellow pigment.

We claim:

1. A process for specifically influencing the triboelectric effect of azo pigments in electrophotographic toners or developers or in powders for surface coating, which comprises adding to the azo pigments at the coupling reaction stage, at the laking stage or in the course of finishing at least one saltlike cationic compound of the general formulae

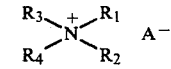 (1)

and/or

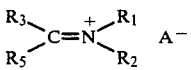 (2)

and/or

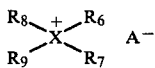 (3)

wherein in the case of the general formulae (1) and (2), $R_1$, $R_2$, $R_3$ and $R_4$ are independently of one another straight-chain or branched alkyl groups of 1 to 30 carbon atoms, oxyethyl groups of the general formula —$(CH_2—CH_2—O)_n$—R, wherein R is a hydrogen atom or an alkyl($C_1$-$C_4$) or an acyl group and n is a number from 1 to 10, monocyclic or polycyclic cycloaliphatic radicals of 5 to 12 carbon atoms, monocyclic or polycyclic aromatic or araliphatic radicals, which aliphatic, araliphatic and aromatic radicals may be substituted by hydroxyl, alkoxy($C_1$-$C_4$)—, primary, secondary or tertiary amino groups, acid amine groups or fluorine, chlorine or bromine atoms, $R_5$ is a hydrogen, fluorine, chlorine or bromine atom or an alkyl ($C_1$-$C_6$)—, alkoxy ($C_1$-$C_6$)— or primary amino group and $A^-$ is one equivalent of an anion, and where $R_1$ and $R_3$ can be part of a ring system of 5 to 7 carbon atoms which may be interrupted by 1 or 2 heteroatoms and may contain 1 to 3 double bonds, and wherein in the case of general formula (3) $R_6$, $R_7$, $R_8$ and $R_9$ are independently of one another hydrogen atoms, straight-chain or branched alkyl groups of 1 to 30 carbon atoms, monocyclic or polycyclic cycloaliphatic radicals of 5 to 12 carbon atoms, oxyethyl groups of the general formula —$(CH_2—CH_2—O)_n$—R, wherein n is a number from 1 to 10, or an alkyl($C_1$-$C_4$) or an acyl group, also monocyclic or polycyclic aromatic radicals and/or araliphatic radicals, which aliphatic, aromatic and araliphatic radicals maybe substituted by hydroxyl, alkoxy($C_1$-$C_4$), secondary or tertiary amino groups, acid amide groups or acid imide groups, where the alkyl, cycloalkyl, aralkyl and aryl radicals for $R_1$ to $R_4$ may be substituted by fluorine, chlorine or bromine atoms, and in which X is a phosphorus, arsenic or antimony atom, although if X is an arsenic or antimony atom at least one of the radicals $R_6$ to $R_9$ is not a hydrogen atom and $A^-$ is one equivalent of an anion.

2. The process as claimed in claim 1, wherein in the general formulae 1, 2 and 3 indicated there $R_1$ to $R_4$ are independently of one another hydrogen atoms, straight-chain or branched alkyl groups of 1 to 22 carbon atoms, oxyethyl groups of the general formula —$(CH_2—CH_2—O)_n$—R, wherein R is a hydrogen atom or an alkyl($C_1$-$C_4$), acetyl, benzoyl or naphthoyl group, and n is a number from 1 to 4, also cyclopentyl or cyclohexyl groups, phenyl, 1-naphthyl, 2-naphthyl, tolyl, biphenyl or benzyl radicals, which aliphatic, araliphatic and aromatic radicals mentioned may be substituted by hydroxyl, alkoxy($C_1$-$C_4$), N-monoalkyl($C_1$-$C_4$)amino, N,N-dialkyl($C_1$-$C_4$)amino, phthalimide or naphthalimide groups, fluorine, chlorine or bromine atoms, $R_5$ is a hydrogen, fluorine, chlorine or bromine atom or an alkyl($C_1$-$C_6$), alkoxy ($C_1$-$C_6$) or primary amino group, and $A^-$ is one equivalent of an inorganic anion, and where $R_1$ and $R_3$ as part of a ring system can be a pyridine or piperidine salt or a derivative thereof, and where in the case of the general formula (3) $R_6$ to $R_9$ are independently of one another hydrogen atoms, straight-chain or branched alkyl groups of 1 to 22 carbon atoms, oxyethyl groups of the general formula —$(CH_2—CH_2—O)_n$—R, wherein n is a number from 1 to 4 and R is a hydrogen atom, an alkyl($C_1$-$C_4$), acetyl, benzoyl or naphthoyl group, also phenyl, 1-naphthyl, 2-naphthyl, tolyl, biphenyl or benzyl radicals, which aliphatic, aromatic and araliphatic radicals mentioned may be substituted by hydroxyl, alkoxy($C_1$-$C_6$), monoalkyl($C_1$-$C_6$)amino, dialkyl($C_1$-$C_6$)amino, aliphatic acid amide groups of the formulae —CO—NH—$R_1$ or

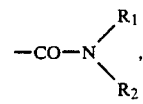

wherein $R_1$ and $R_2$ are alkyl($C_1$-$C_{30}$) groups, also by phthalimide or naphthalimide groups, which alkyl, cycloalkyl, aralkyl and aryl radicals mentioned for $R_1$ to $R_4$ may be substituted by fluorine, chlorine or bromine atoms and in which X is a phosphorus, arsenic or antimony atom, although if X is an arsenic or antimony atom at least one of the radicals $R_6$ to $R_9$ s is not a hydrogen atom, and A⁻ is one equivalent of an inorganic anion.

3. The process as claimed in claim 1, wherein the saltlike cationic compounds are added in an amount of about 0.05 to about 15 percent by weight, based on the pigment provided with the saltlike, cationic compound.

4. The process as claimed in claim 1, wherein the saltlike cationic compounds are added in an amount of about 1 to about 8 percent by weight, based on the pigment provided with the saltlike cationic compound.

5. The process as claimed in claim 1, wherein the saltlike, cationic compounds have a solubility of $>10$ g/l of water or medium at 20° C.

6. A method for producing toners or developers which are used for the electrophotographic copying or manifolding of originals or for printing electronically, optically or magnetically stored data or in color-proofing wherein saltlike, cationic compounds are added to azo pigments as claimed in claim 1.

7. A method for producing powders or powder coatings used for the surface coating of articles made of metal, wood, plastics, glass, ceramics, concrete, textile material, paper or rubber, wherein saltlike, cationic compounds are added to azo pigments as claimed in claim 1.

* * * * *

UNITED STATES PATENT AND TRADEMARK OFFICE
CERTIFICATE OF CORRECTION

PATENT NO. : 4,957,841
DATED : September 18, 1990
INVENTOR(S) : HANS-TOBIAS MACHOLDT, ET AL.

It is certified that error appears in the above-identified patent and that said Letters Patent is hereby corrected as shown below:

Column 6, Line 20, "rare" should read -- care -- .

Column 15, Line 57, "stirrer" should read -- stirred -- .

Column 19, Line 10, "The 15 mixture" should read -- The mixture -- .

Column 21, Line 16, please strike "F" appearing before -- specifically -- .

In Claim 1 (Column 21, Line 65), "amine" should read -- amide --.

In Claim 2 (Column 22, Line 52), "alkoxy($C_1$-$C_6$)" should read -- alkoxy($C_1$-$C_4$) -- .

Signed and Sealed this

Tenth Day of March, 1992

*Attest:*

HARRY F. MANBECK, JR.

*Attesting Officer*     *Commissioner of Patents and Trademarks*